United States Patent [19]

Jou et al.

[11] Patent Number: 4,934,777
[45] Date of Patent: Jun. 19, 1990

[54] CASCADED RECIRCULATING TRANSMISSION LINE WITHOUT BENDING LOSS LIMITATIONS

[75] Inventors: Dong-Chaung Jou, Simi Valley; Ching-Jong Lii, Monrovia; Bor-Uei Chen, Studio City, all of Calif.

[73] Assignee: PCO, Inc., Chatsworth, Calif.

[21] Appl. No.: 326,657

[22] Filed: Mar. 21, 1989

[51] Int. Cl.$^5$ ............................................... G02B 6/26
[52] U.S. Cl. ................................. 350/96.15; 350/96.16
[58] Field of Search ............................. 350/96.15, 96.16

[56] References Cited

U.S. PATENT DOCUMENTS

| | | | |
|---|---|---|---|
| 4,128,759 | 12/1979 | Hunt et al. | 250/199 |
| 4,469,397 | 9/1984 | Shaw et al. | 350/96.15 |
| 4,557,552 | 12/1985 | Newton et al. | 350/96.15 |
| 4,558,920 | 12/1985 | Newton et al. | 350/96.15 |
| 4,671,605 | 6/1987 | Soref | 350/96.15 |
| 4,723,827 | 2/1988 | Shaw et al. | 350/96.15 |
| 4,753,529 | 6/1988 | Layton | 356/345 |
| 4,768,850 | 9/1988 | Moslehi et al. | 350/96.15 |
| 4,778,239 | 10/1988 | Shaw et al. | 350/96.16 |

OTHER PUBLICATIONS

K. P. Jackson et al., "Optical Fiber Delay-Line Signal Processing", IEEE Trans. Microwave Theory Tech., vol. MIT-33, p. 193, 1985.
M. Tur et al., "Fiber-Optic Signal Processor with Applications to Matrix-Vector Multiplication and Lattice Filtering," Opt. Lett., vol. 7, p. 463, 1982.
K. P. Jackson et al., "Microbend Optical Fiber Tapped Delay Line for Gigahertz Signal Processing," Appl. Phys. Lett., vol. 41, p. 139, 1982.
J. E. Bowers, et al., "Filter Response of Single-Mode Fiber Recirculating Delay Lines," Electron Lett., vol. 18, p. 110, 1982.
B. Moslehi et al., "Fiber-Optic Lattice Signal Processing," Proc. IEEE vol. 72, p. 909, 1984.
C. C. Wang, "Cascaded Single-Mode Fiber Optic Transversal Filters", Proc. SPIE High Frequency Optical Communication, vol. 716, p. 82, 1986.
S. A. Newton et al., "Optical Fiber V-Groove Transversal Filter," Appl. Phys. Lett., vol. 43(2), p. 149, 1983.

Primary Examiner—William L. Sikes
Assistant Examiner—John Ngo
Attorney, Agent, or Firm—Antonio M. Fernandez

[57] ABSTRACT

A single-mode optical fiber delay line for filtering at high frequencies utilizes an nth order cascaded recirculating configuration comprised of n+1 couplers. Each coupler has two input fibers and two output fibers. One of the output fibers of each coupler except the last is connected to one of the input fibers of the next coupler in cascade to form a feed-forward path. The other output fiber of each coupler except the first is connected to the other input fiber of the preceding coupler, thus forming a feed-backward path. The feed-forward path and the feed-backward path of adjacent couplers form a delay loop. The delay time in each succeeding delay loop is increased by an incremental delay $\tau$ equal to the reciprocal of the center frequency of the filter. The delay in the first delay loop is selected to be some multiple m of $\tau$, where m is an integer selected for a total delay T which permits the use of optical fiber of a length sufficient to avoid bending losses in the optical fiber. The incremental time delay $\tau$ can be made extremely small, thereby making the operating frequency of the filter extremely high.

5 Claims, 4 Drawing Sheets

4,934,777

CASCADED RECIRCULATING TRANSMISSION LINE WITHOUT BENDING LOSS LIMITATIONS

This invention was made with Government support under Contract F30602-87-C-0015 awarded by the Department of the Air Force. The Government has certain rights in this invention.

TECHNICAL FIELD

The invention relates to an nth order recirculating filter utilizing directional couplers connected in cascade along a length of transmission line to form delay loops, and more particularly to a novel architecture for such recirculating filters using optical fibers which overcomes fundamental bending loss limitations in forming delay loops.

BACKGROUND OF THE INVENTION

Although electronic signal processing techniques are effective at frequencies below 1 to 2 GHz, they are of limited applicability at higher frequencies. Single-mode optical fiber, on the other hand, is an excellent frequency-independent delay medium (0.2 km/$\mu$sec), with demonstrated modulation bandwidth >100 GHz.km and low loss (<0.2 dB/km). The low loss, large bandwidth, and the small size associated with single mode optical fiber make it an attractive choice as a delay line to implement signal processing functions at microwave frequencies. As a result, use of such a fiber can form the basis of signal processing elements offering orders of magnitude increase in bandwidth over electrical devices.

Signal processing optical fiber devices are schematically, structurally and operationally similar to their electronic counterparts. The design, architectures and analysis are also essentially equivalent. However, the fundamental bending loss limitation inherent in recirculating delay line structures has impeded the use of optical fiber for such delay applications as performing a bandpass filter function.

Many processing operations using basic tapped and recirculating delay lines together with more complex feed-forward and feed-backward lattices, have already been demonstrated. K. P. Jackson, et al., "Optical fiber delay-line signal processing," IEEE Trans. Microwave Theory Tech., Vol. MTT-33, p. 193, (1985). Simple tapped delay lines carry out basic transversal filter operations (convolution, correlation, matched filter and code generation) as well as bandpass filters and notch filter operations at frequencies above 1 GHz. See K. P. Jackson, et al., "Microbend optical fiber tapped delay line for gigahertz signal processing," Appl. Phys. Lett., Vol. 41, p. 139, (1982); J. E. Bowers, et al., "Filter response of single-mode fiber recirculating delay lines," Electron. Lett., Vol. 18, p. 110, (1982); S. A. Newton, et al., "Optical fiber V-groove transversal filter," Appl. Phys. Lett., Vol. 43(2), p. 149, (1983); C. C. Wang, "Cascaded single-mode fiber optic transversal filters," Proc. SPIE High Frequency optical communication, Vol. 716, p. 82, (1986). Recirculating delay lines are capable of temporary data storage and data rate transformation and have been demonstrated as frequency filters above 1 GHz. Fiber-lattice structures can perform matrix-vector multiplication at 100 MHz and broadband filtering at frequencies in excess of 1 GHz. B. Moslehi, et al., "Fiber-optic lattice signal processing," Proc. IEEE, Vol. 72, p. 909, (1984).

Extension to frequencies of 10 GHz, and above, is straightforward in principle. However, it requires the use of shorter fiber lengths, more compact designs and faster optoelectronic interfaces. The designs to date result in processors which operate at much lower frequencies. In addition, in a straightforward implementation, bending losses in the fiber place a lower limit on the length of the loop. For example, in a tapped fiber delay line of the type disclosed in U.S. Pat. No. 4,558,920 to Newton, et al., the tapping points are usually separated by a distance equal to the circumference of the cylinder around which the optical fiber is looped. The bending loss will limit the minimum loop length (cylinder circumference) and thus limit the high frequency of operation. For higher frequencies, it is necessary to consider alternative designs and architectures, e.g. multiple tap points per fiber loop around the cylinder, linear tap configurations, or a recirculating lattice. The present invention considers a recirculating lattice approach.

SUMMARY OF THE INVENTION

In accordance with the present invention, an nth order cascaded recirculating filter utilizes couplers spaced along a length of transmission line. Each coupler has two inputs and two outputs. One of the outputs of each coupler is connected to one of the inputs of the next coupler in cascade to form a feed-forward transmission path, and the other one of the outputs of each coupler connected to the other input of the preceding coupler to form a feed-backward transmission path. The feed-forward path and feed-backward path form a closed delay loop. Each delay loop along the cascaded couplers is made longer by an increment of delay time $\tau$ equal to the reciprocal of the desired center frequency $f_c$ for the bandwidth of the filter. The feed-backward loop between the first pair of couplers is provided with a basic delay T equal to a multiple m of the increment $\tau$, where m is an integer selected to be large enough to avoid incurring bending losses in the feed-backward transmission path between cascaded couplers.

DESCRIPTION OF PREFERRED EMBODIMENTS

Figure 1:
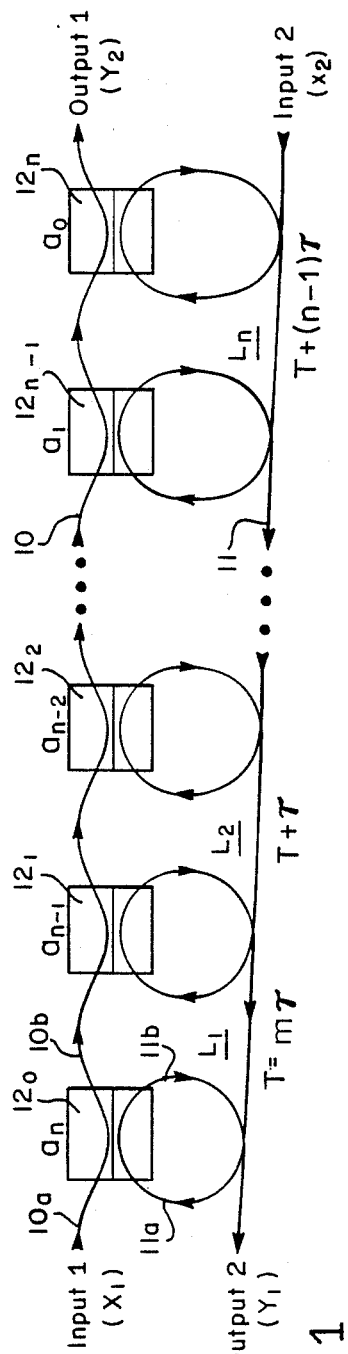
FIG. 1 illustrates schematically a nth order cascaded recirculating filter.
Figure 1A:
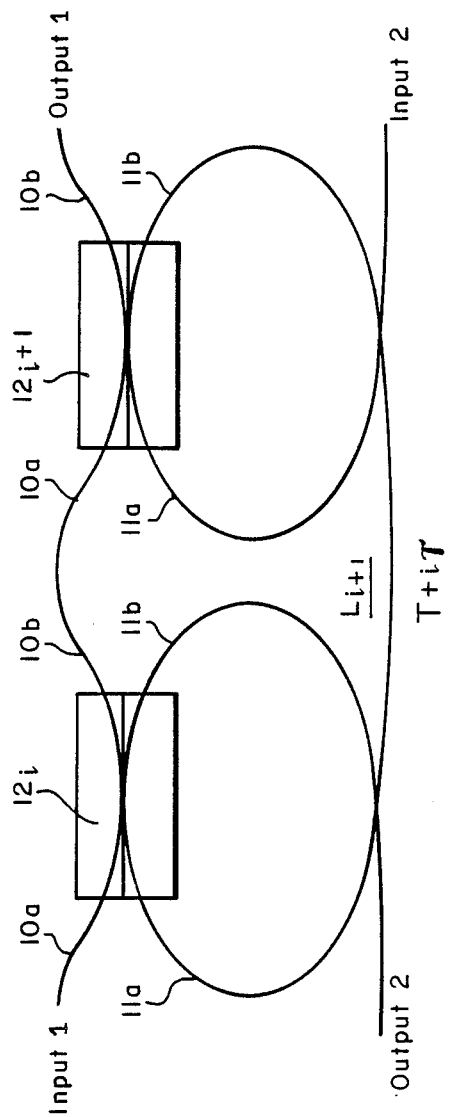
FIG. 1a illustrates a single closed delay loop in the cascaded recirculating filter illustrated in FIG. 1 with a delay $T + i\tau$.

Referring to FIG. 1, a cascaded recirculating filter consists of two optical transmission paths 10 and 11, and directional couplers $12_0, 12_1, 12_2 \ldots 12_{n-1}, 12_n$, preferably implemented with single-mode optical fibers and evanescent coupling between inputs 10a and 11a, and some coupling, e.g., 50 to 90%, between input 10a and output 11b and between input 11a and output 10b, with 100% efficiency (i.e., with zero loss of power in the coupler). Each coupler $12_i$ has two inputs 10a and 11a, and two outputs 10b and 11b, as shown in FIG. 1a.

One of the outputs of each coupler is connected to one of the inputs of the next coupler in sequence to form a feed-forward transmission path, namely the fiber 10 connecting the upper output 10b of coupler $12_i$ to the upper input 10a of the next coupler $12_{i+1}$ in cascade. The other output fiber is connected to the input fiber of the preceding coupler to form a feed-backward transmission path, namely the transmission path 11 connecting the lower output 11b of coupler $12_{i+1}$ to the lower input 11a of the preceding coupler $12_i$, as shown in FIG. 1a for two adjacent couplers $12_i$ and $12_{i+1}$. The transmission paths 10 and 11 between two adjacent couplers $12_i$ and $12_{i+1}$ form a delay loop $L_{i+1}$ by coupling the feed-forward transmission path 10 with the feed-backward transmission path 11 in the couplers. Thus, the delay loop $L_{i+1}$ consists of the output 10b from the center of coupler $12_i$, which is connected directly to the input 10a of the coupler $12_{i+1}$, and from there coupled to output 11b of the coupler $12_{i+1}$ which feeds back to the input 11a of the coupler $12_i$. The total delay $T+i\tau$ is of the loop length from the center of the coupler $12_i$ through the coupler $12_{i+1}$ and back to the center of the coupler $12_i$. The output 11b of the coupler $12_i$ feeds back to the input of the preceding coupler not shown in FIG. 1a.

Such a loop $L_i$ is, without defining the feed-backward delay as $T+i\tau$, known in the prior art (see Moslehi, et al., cited above, FIG. 5a). The present invention concerns a novel architecture for an nth order filter utilizing cascaded couplers where the novelty is the delay in the delay loop defined as $T+i\tau$, as will now be described in more detail with reference to FIG. 1.

The coupling coefficient of the coupler $12_n$ on the right hand side is indicated as $a_o$, and the others from right to left as $a_1 \ldots a_{n-2}, a_{n-1}, a_n$, where "coupling coefficient" is defined as the fraction of power coupled from one transmission path through the coupler into the other. For example, if the coupling coefficient is 0.7, the fraction of power coupled from the input transmission path 10a to the output transmission path 11b is 7/10, i.e., 70%. Energy thus coupled into the delay loop $L_i$ is coupled back into the transmission path 10 through the output 10b with the same coupling factor, namely 0.7 of the fraction 7/10, which is equal to 0.49. The balance of $0.3 \times 7/10 = 0.147$ recirculates in the loop. As will be noted with reference to an exemplar for a third order filter shown in FIG. 3, a high uniform coefficient of coupling is preferred for the filter function, although it is recognized that other designs may be employed such as tapering the coefficient of coupling from 0.5 to 0.9, or from 0.9 to 0.5.

In this configuration, the corresponding delay of the first loop on the left is set for a basic period T equal to some multiple $\tau$ indicated as $m\tau$ where $\tau$ is defined as an "incremental delay time" and m is an integer. A pertinent value of m will be discussed below. The incremental delay time $\tau$ is set equal to the reciprocal of the center frequency $f_c$ of the desired passband response. This arrangement will become clear after the structure is described. The corresponding delay of the second loop $L_2$ is $T+\tau$ and of the succeeding loops are $T+2\tau$, $T+3\tau \ldots T+(n-1)\tau$.

Figure 2:
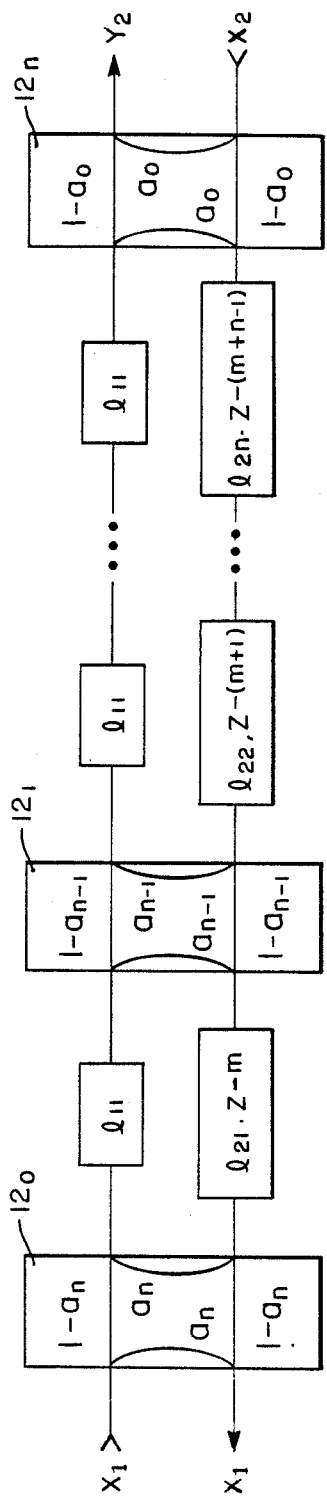
FIG. 2 illustrates a block diagram in Z-transformation form for the nth order cascaded recirculating filter of FIG. 1.

From the foregoing, it is evident each loop has two ports with two terminals at each port (two inputs, two outputs). In order to more easily derive the transfer function H(f) of the filter, where H(f) is a complex function equal to the ratio of the output to the input as a function of frequency, the equivalent block diagram representation of the cascaded recirculating filter in Z-transformation form shown in FIG. 2 is used. A. V. Oppenheim, et al., "Digital Signal Processing," Englewood Cliffs, N.J., Prentice-Hall, 1975; S. K. Mitra, et al., "Digital ladder networks," IEEE Trans. Audio Electroacoust., Vol. AU-21, p. 30, (1973). The Z-transformation block diagram is a simple series of elements with each element being a two-port system, each port having an input and an output terminal. In a linear and time-invariant two-port system, the two pairs of signals $X_1$, $Y_1$ and $Y_2$, $X_2$ at the two ports can be related by a chain matrix where $X_1$ is an input and $Y_1$ is an output. From the Z-transformation form, it is evident from FIG. 2 that if g represents the chain matrix of an element and G is the chain matrix of the overall system, then G is the product of the chain matrices representing all of the elements multiplied in the same order in which they are cascaded in the system:

$$G = g_1 \cdot g_2 \cdots g_{n-1} \cdot g_n \quad (1)$$

Figure 2A:
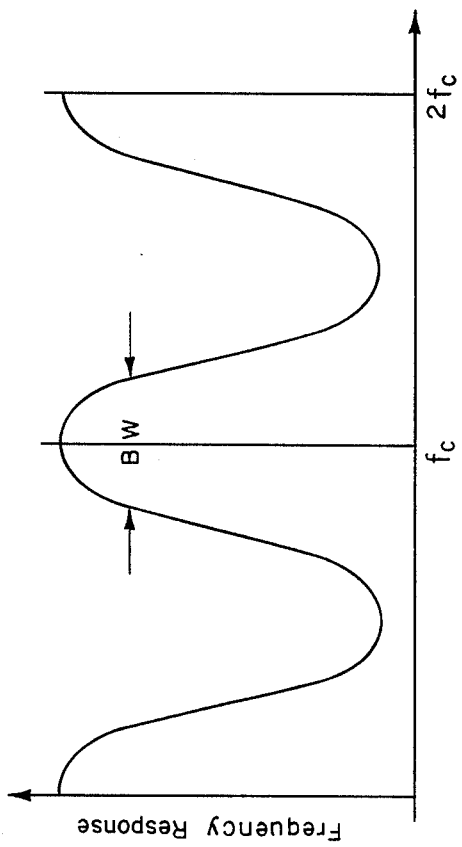
FIG. 2a is a graph of filter characteristics for the nth order cascaded recirculating filter of FIG. 1 shown in the Z-transformation form in FIG. 2.

And it is seen evident that a delay in the feedback path between adjacent couplers $12_0, 12_1, 12_2, \ldots 12_{n-1}, 12_n$ increases from $Z^{-m}$ by one unit of delay for each successive coupler to provide the required feed-backward loop delays of $Z^{-m}, Z^{-(m+1)} \ldots Z^{-(m+n-1)}$ for the cascaded recirculating filter. In accordance with the present invention, $Z^{-m}$ corresponds to the Z-transform of delay time T, and T is some multiple of a loop incremental delay time $\tau$ which defines the center frequency of the delay line, i.e., where the center frequency $f_c$ shown in FIG. 2a is equal to the reciprocal of the loop incremental delay time $\tau$. This is done in order to avoid extremely tight fiber optic bending for very small loop delays required for selecting a center frequency higher than 1 GHz or 2 GHz corresponding to a high frequency of filter operation, which would otherwise result in bending losses. Thus, in accordance with this invention, T is made equal to some multiple m of the loop incremental delay time $\tau$, where m is a positive integer, i.e., the time delay $T = m\tau$ for the first feedbackward delay loop $L_1$ is made large enough (by proper selection of m) to avoid tight bending of the optical fiber 11. Then for each subsequent loop $L_2, \ldots L_n$, the delay T is incremented by an additional unit of delay $\tau$, where $\tau = 1/f_c$. This incremental delay added to each successive delay loop is readily provided by increasing the length of the loop connecting the output 11b and the input 11a of adjacent couplers $12_{i+1}$ and $12_i$, respectively, of loop $L_i$, over the total length of the previous feed-backward delay loop $L_{i-1}$. The increment of delay loop length to be added can be readily calculated once $\tau$ is determined, i.e., once the center frequency of the desired filter operation is determined.

Figure 3:
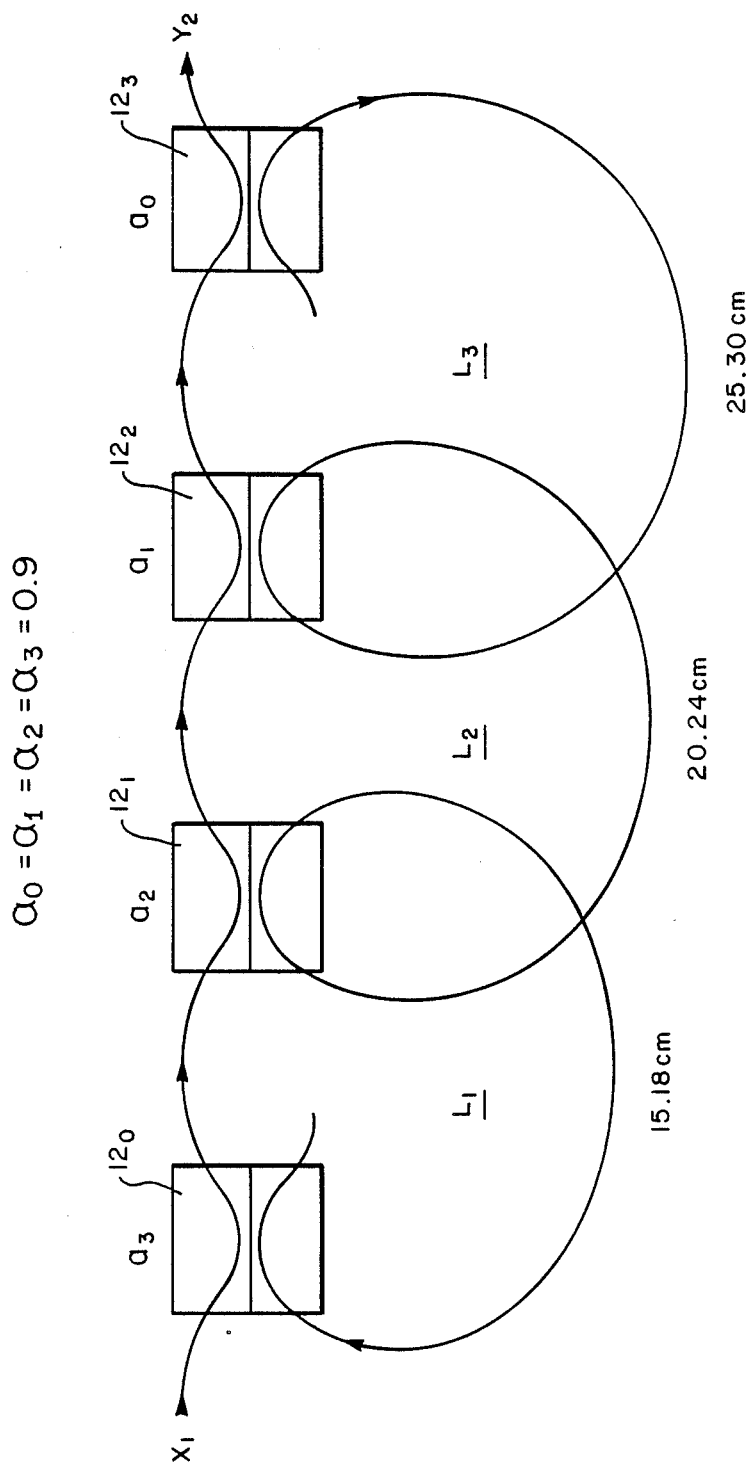
FIG. 3 illustrates schematically an examplar third order cascaded recirculating filter.

An examplar for an optimized third-order cascaded recirculating filter is shown in FIG. 3. Given a desired center frequency of 4 GHz, the design parameters, including the optical fiber length for each stage and the coupling coefficient, are as shown. The velocity of light, v, in the optical fiber having an index of refraction $n = 1.5$ is $$v = \frac{c}{n} = \frac{2.9978 \times 10^8 m/s}{1.5} = 2.0235 \times 10^8 m/s \qquad (2)$$

where c is the speed of light in space. The incremental delay $\tau$ for the given center frequency of 4 GHz is given by $$\tau = \frac{1}{f_c} = \frac{1}{4\text{GHz}} = 0.25 ns. \qquad (3)$$

The incremental length $L_\tau$ of optical fiber required for a delay of 0.25 ns is then determined to be $$L_T = v\tau = 2.0235 \times 10^8 \ m/s \times 0.25 \ ns = 5.06 \ cm. \qquad (4)$$

To avoid unacceptable bending losses, a preferred minimum loop length is about 15 cm. Therefore, the factor m is selected to be 3, and the delay T for the first loop corresponds with a loop length $L_1$ of 15.18 cm. The loop length for the remaining two cascaded filter loops $L_2$ and $L_3$ then correspond to 20.24 and 25.30 cm, as shown.

Figure 4:
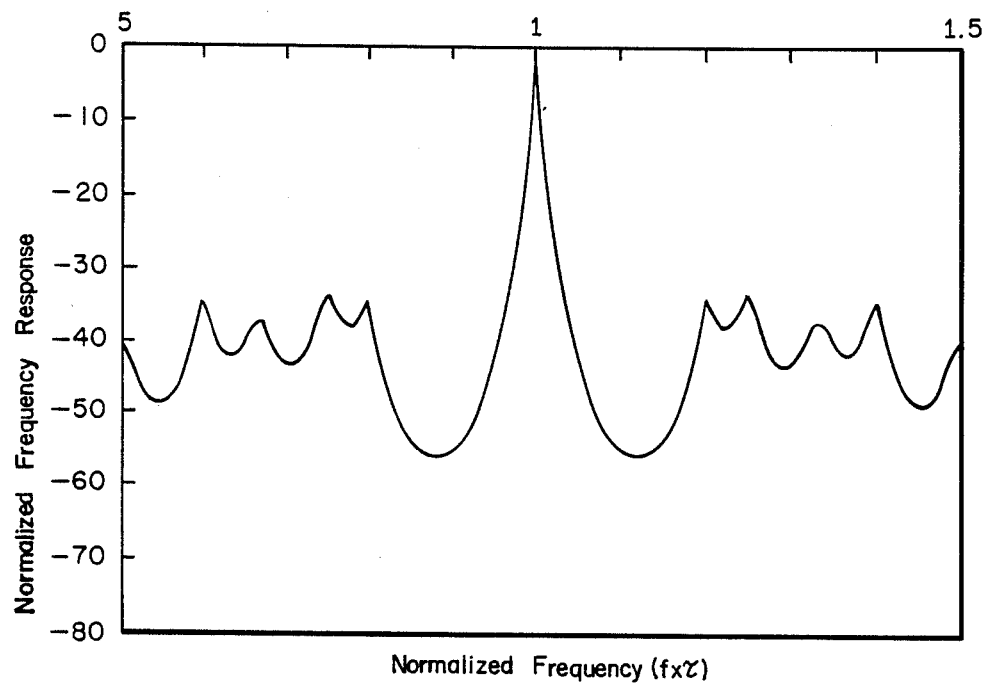
FIG. 4 is a graph showing the frequency response for the third order filter of FIG. 3.

The frequency response of the filter in FIG. 3 is shown in FIG. 4. This filter exhibits a quality factor (Q) of 185, where Q is the ratio of center frequency to bandwidth of the filter and side lobe rejection ratio of greater than 33 dB. Higher operating frequencies can be achieved by calculating T and $\tau$ appropriately. In principle, $\tau$ can be made infinitesimally small since the bending loss is a function of the radius for the loop of delay T, rather than a loop for incremental delay time $\tau$. Although there is a practical limit to how small $\tau$ can be made with accuracy, operation in the 50 GHz to 100 GHz frequency range should be achievable.

Figure 5:
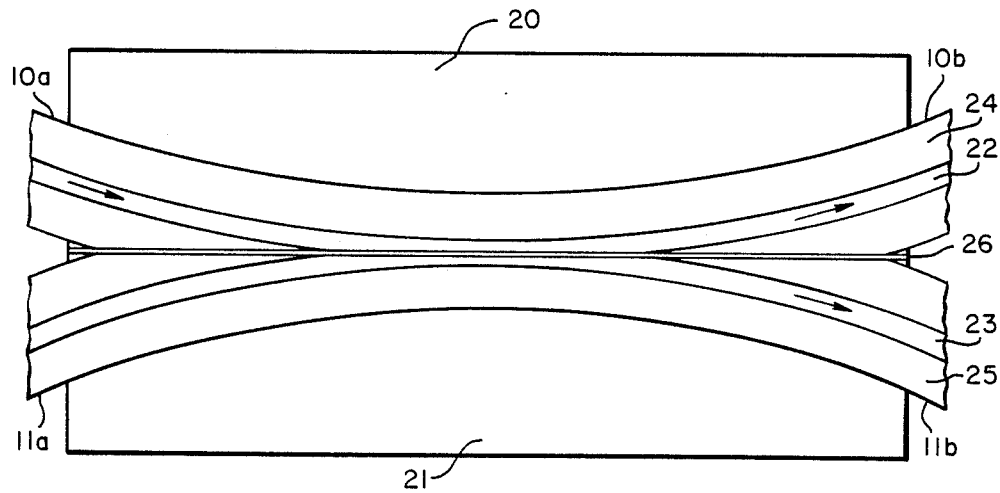
FIG. 5 illustrates in a cross-sectional view the structure of a coupler used in the present invention.

Bidirectional couplers with a coupling coefficient a can be readily fabricated. A coupling coefficient of 0.9 is typical for a coupler fabricated as illustrated in FIG. 5. Two silicon blocks 20 and 21 are first prepared to receive optical fibers 10' and 11' as shown in cross section with a bend of large radius (about 2.5 cm). After the optical fibers are cemented in their curved grooves, as with epoxy, the mating (grooved) surfaces are polished until the cores 22 and 23 of the optical fibers 10' and 11' have been ground past their cladding layers 24 and 25 to very near their center lines. A thin film of oil 26 having about the same index of refraction as the core is provided between the polished surfaces to assure the coupling desired. The two blocks are ideally aligned so that the center lines of the optical fibers are tangent at the center of the blocks. Couplers fabricated in this or similar manner are commercially available with two input fiber pigtails and two output fiber pigtails protruding from the mated blocks. One output fiber pigtail from one block may be fused directly to the input fiber pigtail of the next block in cascade to form the continuous feed-forward transmission path 10. The necessary lengths of optical fiber required to make up the delay loops are then cut and fused to the other input and output fiber pigtails.

The advantage of the present invention over conventional recirculating delay line filters that employ a constant delay loop length for each stage is significant in that it permits fabricating filters operating at much higher frequencies without limit due to bending losses; the limit is only in how small the incremental delay time $\tau$ may be made.

Although preferred embodiments have been described and illustrated with optical fiber used for the transmission paths, it will be evident to those skilled in the art that the present invention may be practiced with other forms of transmission lines, such as dielectric supported strip lines of the symmetrical or sandwich type, or of the unsymmetrical type referred to as microstrip lines, or other types of microwave transmission lines, such as coaxial cables or waveguides. Consequently, it is intended that the claims be interpreted to cover such other transmission lines used in a recirculating delay line filter of the general Z-transform characteristics illustrated in FIG. 2.

We claim:

1. An nth order recirculating filter utilizing directional couplers connected in cascade along a length of transmission line, wherein each coupler has two inputs and two outputs for receiving and transmitting energy, a first one of the outputs of each coupler being connected to a first one of the inputs of the next coupler in cascade to form a feed-forward path, and a second one of the two outputs of each coupler connected to a second one of the two inputs of a preceding coupler to form a feed-backward path, said feed-forward path and said feed-backward path between adjacent ones of said couplers forming a loop with an incremental increase in the delay in each successive feed-backward path between adjacent ones of said couplers, wherein said incremental increase is a delay time $\tau$ equal to the reciprocal of the center frequency $f_c$ of a desired bandwidth of filter operation, and said first loop has a delay T equal to a multiple m of $\tau$, where m is an integer greater than one.

2. An nth order recirculating filter as defined in claim 1 wherein said transmission line is comprised of single-mode optical fiber and said integer m is selected to provide a loop delay which corresponds with a loop length sufficient to avoid bending losses.

3. An nth order recirculating optical fiber bandpass filter having a center frequency $f_c$ comprising a plurality of directional fiber-optic couplers in cascade, each coupler having two input optical fibers and two output optical fibers, each coupler except a last one of said couplers in cascade having one output optical fiber connected to an input optical fiber of the next coupler in cascade for direct transmission of light through said couplers in a feed-forward light path, each coupler except said last one of said couplers having a second one of said two input fibers connected to a second one of said two output fibers of the next coupler in cascade to form a delay loop for transmission of light from the next coupler in a feed-backward path with a predetermined delay, said predetermined delay for a first loop between a first pair of couplers connected in cascade being predetermined to be $m\tau$, where $\tau$ is a delay equal to the reciprocal of said center frequency $f_c$ and m is an integer greater than one selected to provide a first loop with delay T equal to $m\tau$ and of sufficient length to avoid losses associated with bending of optical fiber, and the loop delay between successive pairs of couplers numbered 0, 1, 2, ... n in sequence along said light path is incremented by a delay equal to $\tau$, thereby to provide a total delay for the ith delay loop of $T + i\tau$, where i is the number of the input coupler of the ith delay loop, and $\tau$ is equal to the reciprocal of said center frequency $f_c$.

4. An nth order recirculating fiber bandpass filter as defined in claim 3 wherein the loop delay between successive pairs of couplers is inplemented by incremental increase in loop length.

5. An nth order cascaded recirculating filter comprising a plurality of optical couplers spaced along a first single-mode optical fiber, each coupler having a first single-mode optical fiber input and a first single-mode optical fiber output connected to form said first single-mode optical fiber, a second single-mode optical fiber input and a second single-mode optical fiber output, said second single-mode optical fiber output of each coupler connected to said second single-mode optical fiber input of the next preceding coupler along said first single-mode optical fiber to form a feed-backward loop between adjacent couplers with a loop length in each successive feed-backward delay loop of delay time T that is increased by an incremental delay time $\tau$ from one pair of adjacent couplers to the next, where the incremental increase in delay time $\tau$ for each successive pair of adjacent couplers is the reciprocal of the center frequency of a desired bandwidth of filter operation, and said incremental increase in delay time $\tau$ is implemented by an incremental increase in loop length, and said feed-backward delay loop time T is equal to some multiple m of $\tau$, where m is an integer greater than one selected to provide a feed-backward delay time T for the first loop of a length sufficient to avoid bending losses at the desired bandwidth of filter operation.

* * * * *